(No Model.)  A. ATWOOD.  2 Sheets—Sheet 1.
CAR WHEEL.

No. 294,750.  Patented Mar. 11, 1884.

Witnesses
W. Colborne Brookes
Geo. Wadman

Anson Atwood
Inventor (No Model.) 2 Sheets—Sheet 2.

A. ATWOOD.
CAR WHEEL.

No. 294,750. Patented Mar. 11, 1884.

Fig. 6ª.

Witnesses
W. Colborne Brookes
Geo Wadman

Anson Atwood
Inventor
by Wyllys Hodges
Atty

UNITED STATES PATENT OFFICE.

ANSON ATWOOD, OF DUNELLEN, NEW JERSEY, ASSIGNOR TO THE ATWOOD HEMP CAR WHEEL COMPANY, OF NEW YORK, N. Y.

CAR-WHEEL.

SPECIFICATION forming part of Letters Patent No. 294,750, dated March 11, 1884.

Application filed October 23, 1883. (No model.)

*To all whom it may concern:*

Be it known that I, ANSON ATWOOD, a citizen of the United States, residing at Dunellen, in the county of Middlesex and State of New Jersey, have invented certain new and useful Improvements in Car-Wheels, of which the following is a specification, reference being had to the drawings, in which similar letters of the different figures refer to similar parts of the wheel, and in which—

Figure 1:
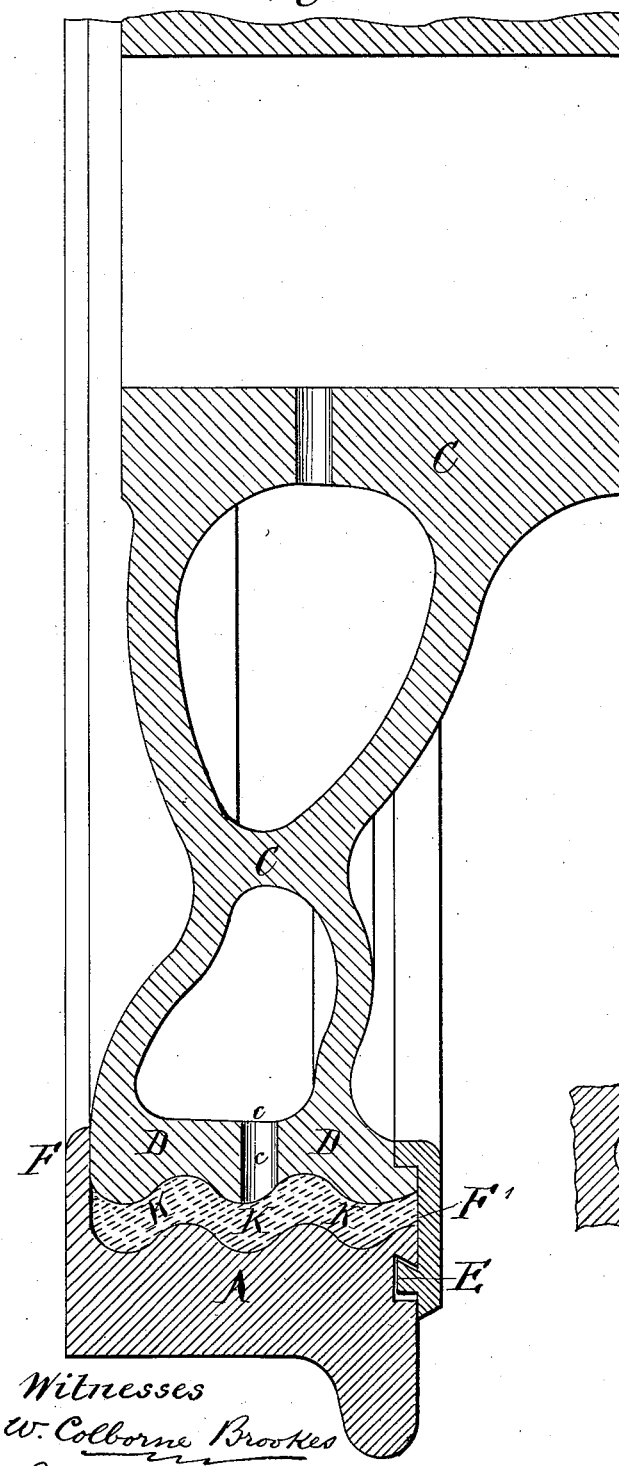
Figure 2:
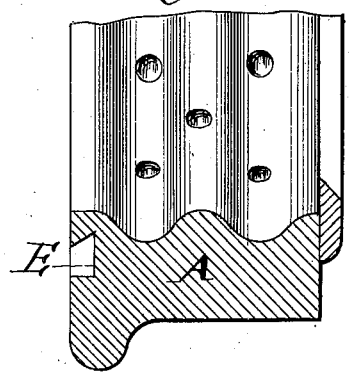
Figure 3:
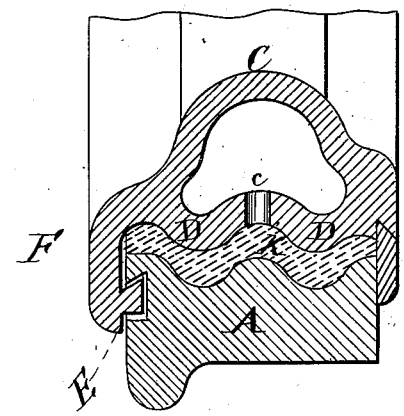
Figure 8:
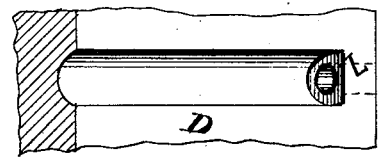
Figure 4:
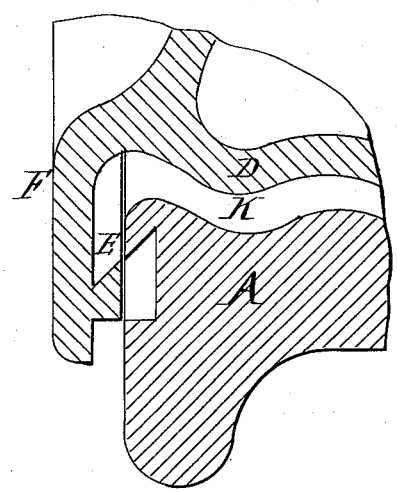
Figure 5:
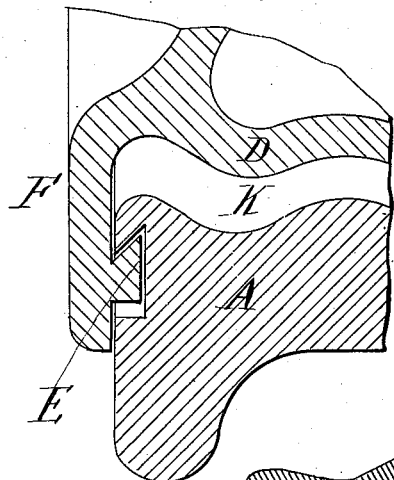
Figure 6:
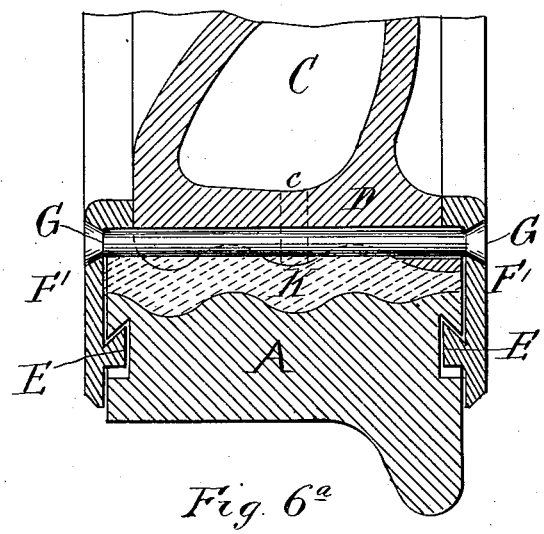
Figure 9:
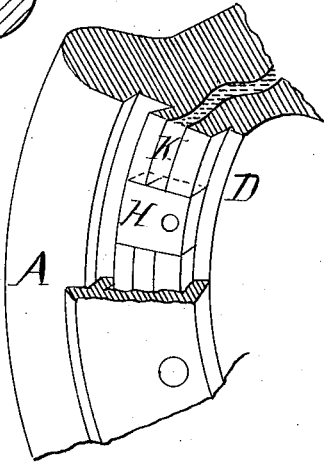
Figure 7:
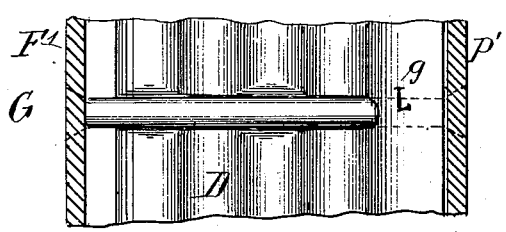
Figure 7:
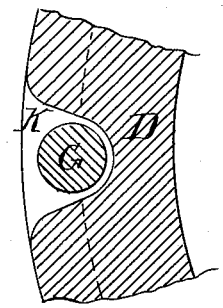

Figure 1 is a section of one-half of a wheel from its center to the rim, showing one form of my improvement. Fig. 2 is a perspective of a part of the tire, showing one feature of the invention. Fig. 3 is a section across the tire and rim of the wheel, showing another form of the improvement. Figs. 4 and 5 show in section, on a larger scale, one of its features. Fig. 6 is a section across the tire and rim, showing another form of the invention. Fig. 6ª is a perspective view of this section, showing a detail further illustrated in Fig. 8. Fig. 7 is a section of a part of the body of the wheel through its center in the plane of revolution, showing a detail; and Figs 8 and 9 show further details, omitted in the other figures for the sake of clearness.

My invention relates to those wheels in which an elastic cushion is interposed between the tire and center of the wheel, and especially where the configuration of this packing is such as to lock the tire to the center after the manner patented by me in Letters Patent No. 175,321, dated March 28, 1876.

The objects of the invention are principally to improve the character of the packing, to provide means for temporarily securing broken parts of the tire to the wheel without interfering with the advantages of the packing, to improve the devices for preventing the tire from slipping upon the body in a circumferential direction, and to strengthen the plates constituting the body of the wheel by obviating certain defects involved in the present system of casting hollow-bodied wheels.

The nature, character, and scope of these improvements will be better understood from the following description and claims.

My improved packing consists of hemp, cotton, or other strong fiber of similar character, moistened with vaseline in the proportion of about one pound of semi-fluid vaseline to ten pounds of the fiber. The proportion may be varied; but this is, as far as my experience goes, the best. The packing so formed has the advantage over one made of fiber and glycerine, that it is water-repellent and more durable in the use to which it is applied.

Describing my wheel, C is the body of the wheel, which may be formed either with spokes or plates between a rim, D, and the hub.

I have shown in Fig. 1 a wheel formed after the principle of the patent granted to me May 15, 1847, No. 5,112, having a hollow body between the hub and rim, the form shown having, however, two independent cavities or arches between the hub and rim. In casting such wheels the said core, which forms the inner cavity, may be removed through holes between the cavity and the bore of the hub; but the core of the outer cavity has heretofore been removed through holes in the side of the plates, thereby weakening the wheel in one of the places where strength is most needed. I prefer to remove this outer core by holes $d$ through the rim, which I am enabled to do from having a tire separate from the rim. This gives an unperforated body or connection between the hub and the rim.

My other improvements are applicable to wheels having spokes, or any form of connection between the rim and hub.

K is the packing, interposed between the tire A and rim D, the inner surface of the tire and outer surface of the rim having circumferential corrugations, shaped substantially as and in connection with the packing, performing the same functions as those in Patent No 175,321, before referred to. The outer surface of the rim and the inner surface of the tire have, however, in addition, small pits or depressions covering the whole or a considerable portion of their surfaces, as shown in Fig. 2. The packing fitting into these prevents the tire from slipping circumferentially on the body of the wheel. When formed as shown, they also aid in preventing the tire from slipping laterally, and might be made so as to entirely dispense with the circumferential corrugations; but their essential function is to prevent circumferential slip, and it is in combining them with the circumferential corrugations, or so shaping them as to perform both functions, that this feature of my improvement lies. It consists, therefore, in so shaping the irregularities as to lock the tire to the rim, both laterally and circumferentially, by means of the packing.

To temporarily hold broken portions of the tire to the rim, I provide a rabbeted or tongue-and-groove engagement between them, either directly or by means of an intermediate locking-ring, the essential and novel feature of which engagement is that it does not form a solid connection between the two parts, and therefore does not interfere with the office of the packing in receiving, absorbing, and deadening the whole radial thrust or jar of the wheel. Its simplest form is shown in Fig. 3, where it is applied to the wheel described in the Patent No. 175,321, before referred to. For the pins and holes of that patent I substitute a circular groove on the face of the tire, and a tongue on the flange of the body engaging with it.

It is obvious that this tongue and groove can slide circumferentially upon each other, and therefore cannot perform the function of the pins described in the old patent. For this I rely upon the hereinbefore-described arrangement of the packing, and other devices to be presently described.

Such an engagement between the tire and rim or wheel-body is not new, they having been before used in wheels having no packing and the tongue fitting tightly in the groove. It is frequently dovetailed and shrunk in by heat, and in all cases would rigidly receive and transmit the radial thrust or jar and prevent the packing from performing its function. I have therefore so formed this tongue and groove that while they perform their proper office they fit each other loosely, and no radial thrust comes upon the tongue or the flange except in case of breakage of the tire. In the form shown in the drawings, which I consider the best, the tongue and groove are dovetailed upon their inner edge—that is, the edge nearest the hub. If, then, the proper relative size is given to the tongue and groove, while the tongue will just enter the groove there will be a space between them when in position. It is this loose engagement which forms the essential feature of this device, and it is shown in detail in Figs. 4 and 5.

In order to secure the greater strength of wrought-iron for the tongue, it may be made upon a separate ring, as shown in Fig. 1. In this figure the tire A has an inwardly-projecting flange, F, upon its inner face, the packing K has the same relation to the tire and rim as before described, and the tire and rim are secured by an independent ring, F'. This ring engages with the tire and rim by means of two tongues and grooves in the same manner as the engagement before described, except that the engagement with the rim need not be loose, but the tongue and groove may be made close-fitting, and instead of a groove in the rim a simple shoulder or rabbet might be used, as shown in the figure. The ring may be secured to the body or rim in the manner shown in Fig. 6, which, moreover, presents a further modification having two rings and dispensing with the flange. Bolts G pass through the rings and packing, and are secured tightly by upsetting or otherwise, clamping the rings to the rim. For the best effect these bolts should pass through grooves cut transversely across the face of the rim, and so large that they leave a space between the bolt and rim, as shown in Fig. 7, into which the packing may penetrate, whereby the bolts do not receive directly the radial thrust. These grooves do not go clear across the face of the rim, but an uncut portion is left on the outer face of the rim, constituting a lip, L, through which, also, the bolt passes; but the bore of the lip is larger than the bolt, so that there is no metallic contact. This groove and lip is shown in Fig. 8 and in Fig. 6ª. The object of this lip is to prevent the bolt coming away from the tire, presenting a further safeguard in case of breakage. The bolts so placed will be further security against rotary slip of the tire on the rim, and I further propose to use keys H, Fig. 9, (several in number,) for the same purpose when the wheel is constructed with the rings. They are shown in Fig. 9, and are pieces of metal under the rings and crossing the packing on the face of the wheel. One end of each key is let into a slot in the tire, and the other into a similar slot in the rim. The bolts may pass through the keys; or the latter may be located at other points in the circumference of the wheel.

I do not claim a ring locking an independent tire to the wheel body or rim by tongue-and-groove or dovetailed locks, such being old; nor do I claim such corrugations upon the face of the tire and rim as to prevent either lateral or rotary slip alone; but What I do claim is—

1. The combination of an elastic packing, K, with the tire A and rim D, having corresponding corrugations or roughenings upon their adjacent faces so shaped as to lock the tire against both lateral and rotary slip on the wheel, substantially as described.

2. The combination of the rim D, tire A, and elastic packing, with their circumferential corrugations, with the loosely-engaging tongue and groove upon the tire, and flange or ring, and with suitable means for preventing rotary slip, substantially as described.

3. The combination of the tire A, rim D, packing K, flange F or ring or rings F', loose tongue-and-groove lock E, and bolts G, having no metallic contact with tire or rim, substantially as described.

4. The combination of the tire A, rim D, packing K, flange F or ring F', lock E, and bolts G, passing through grooves in the rim, with the lip $g$, substantially as described.

5. The combination of the tire A, rim D, packing K, rings or flange F F', lock E, bolts G, and keys H, substantially as described.

6. The compound of fiber and vaseline for packing railway-car wheels, substantially as described.

7. A car-wheel having the separate tire and a body cast in one piece, consisting of the hub and rim, with the intermediate double-arched portion, having sand-holes from the inner arch through the hub and from the outer arch through the rim, and with unperforated sides, substantially as described.

8. In a wheel having a tire, A, capable of yielding radially to thrust or jar, the combination of the body, tire, and a loose tongue-and-groove lock, E, connecting the tire to the body, substantially as and for the purpose described.

ANSON ATWOOD. [L. S.]

Witnesses:
BAYARD F. FOULKE,
ROBERT F. SHEPARD.